United States Patent [19]
Nopper

[11] 3,939,389
[45] Feb. 17, 1976

[54] POSITIONING CONTROL APPARATUS
[75] Inventor: Peter Nopper, Lyss, Switzerland
[73] Assignee: Zumbach Electronic - Automatic, Orpund, Switzerland
[22] Filed: Dec. 21, 1973
[21] Appl. No.: 427,050

[30] Foreign Application Priority Data
    Jan. 17, 1973   Switzerland............ 613/73

[52] U.S. Cl. ................ 318/578; 318/657
[51] Int. Cl.² .......................... G05B 19/36
[58] Field of Search............ 318/656, 657, 578

[56] References Cited
UNITED STATES PATENTS

| | | | |
|---|---|---|---|
| 2,708,730 | 5/1955 | Alexander et al. | 318/657 |
| 2,712,082 | 6/1955 | Yeasting | 318/657 X |
| 3,293,759 | 12/1966 | Moe et al. | 318/657 X |
| 3,594,626 | 7/1971 | Palmer | 318/657 X |
| 3,626,283 | 12/1971 | James | 318/657 X |
| 3,711,758 | 1/1973 | Lelandais | 318/653 X |

Primary Examiner—B. Dobeck
Attorney, Agent, or Firm—Pierce, Scheffler & Parker

[57] ABSTRACT

A device for positioning a part comprises a signal generator which, upon movement of said part within the vicinity of a required position of the part, produces a signal value which passes through zero at a point when said part is in said required position, and a servo system responsive to said signal value to transmit movement to said part until said signal value reaches zero. The signal generator may operate to define a predetermined stop position into which a part, for example a machine part or a workpiece, is to be moved, or, in cooperation with an appropriately movable member, it may be used to trace a predetermined pattern of movement so that the part to be moved follows said pattern.

4 Claims, 7 Drawing Figures

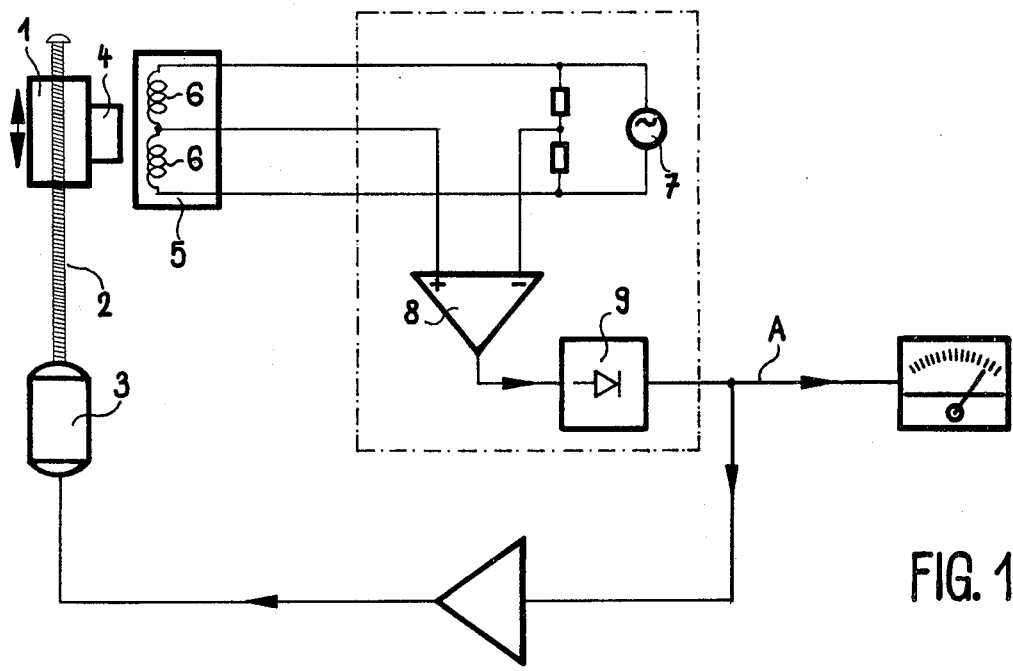
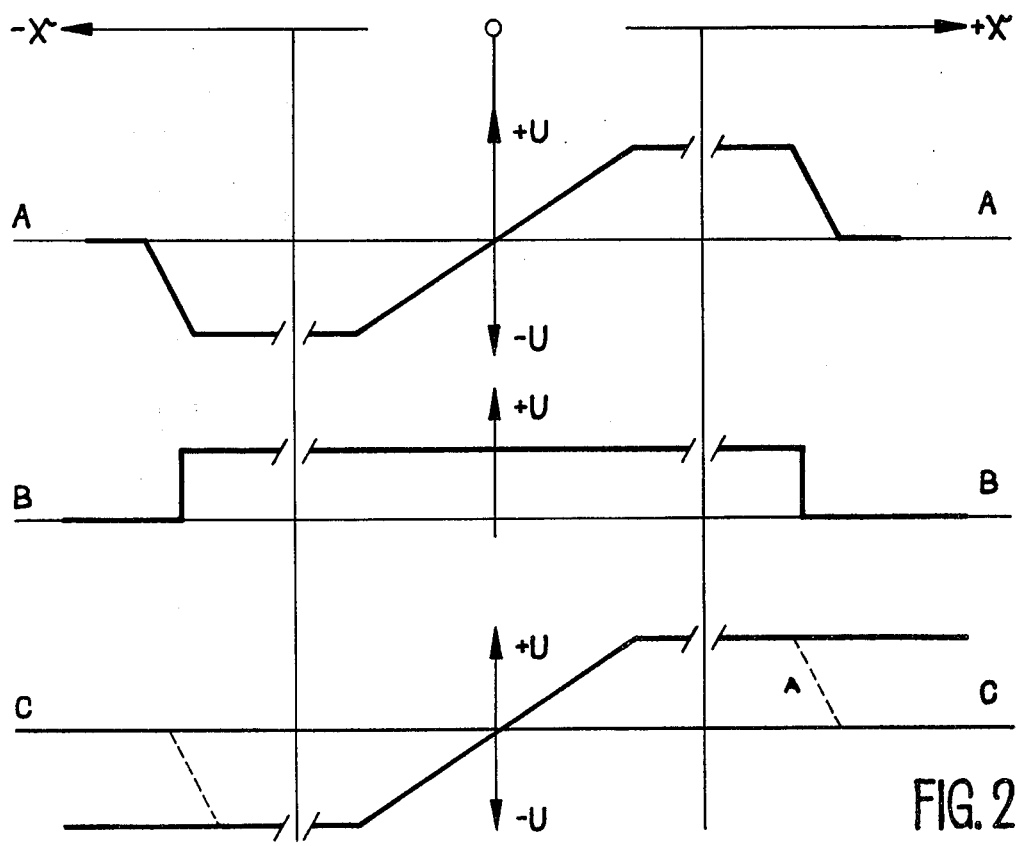
FIG. 1
FIG. 2

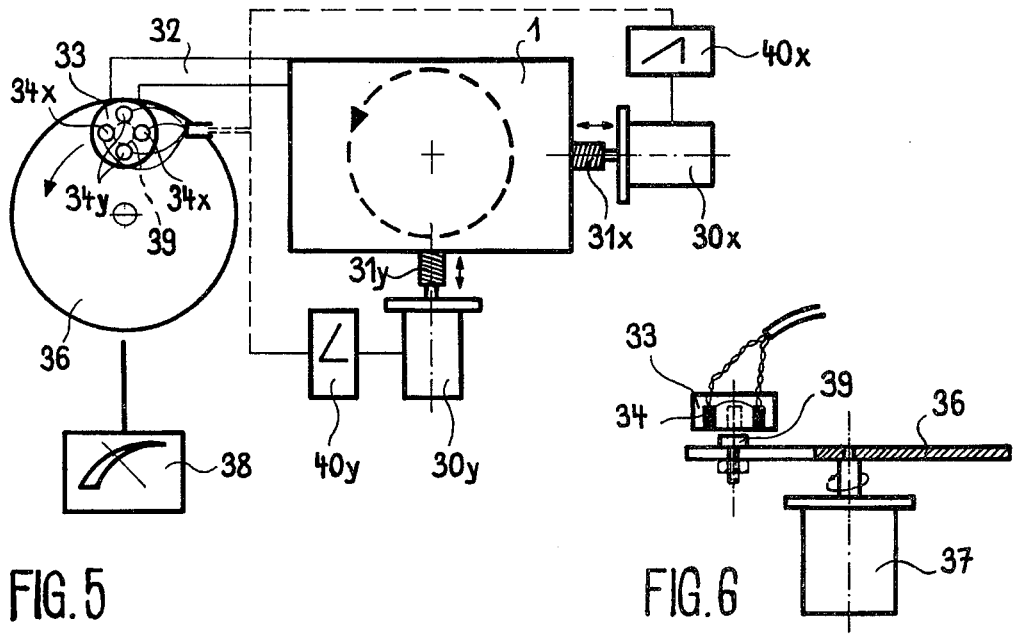
FIG.5
FIG.6
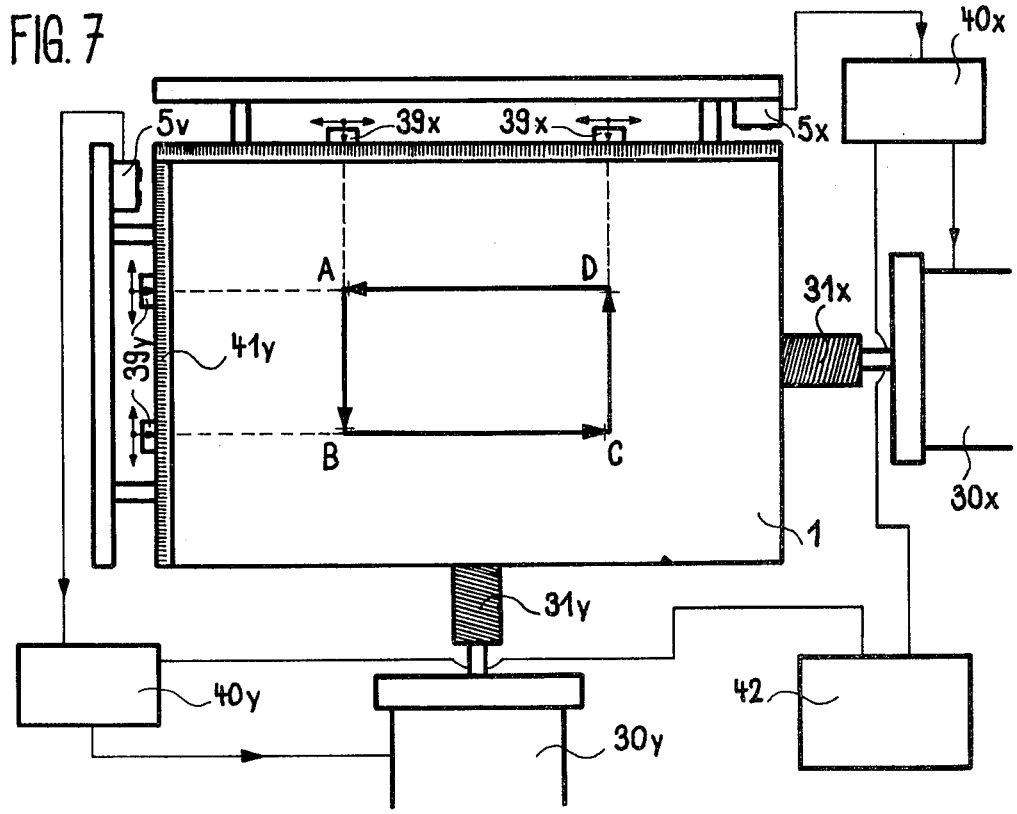
FIG.7

POSITIONING CONTROL APPARATUS

BACKGROUND OF THE INVENTION

1. Field of the Invention

The invention concerns a device for positioning a part, more especially a slide or table of a machine tool or the like, the device having at least one stop.

2. Discussion of the Prior Art

In positioning devices of the kind initially referred to, it is known practice to provide stops having movable sensors which act on switches which in turn switch off the drive for moving the part when the switch is actuated by the sensor (see for example German Patent Specification No. 1,134,915). With this kind of stop there is no certainty as to how rapidly the movement will be halted after the stop has responded, i.e. the extent to which the part runs past the position preset by means of the stop is unknown.

Although, in the case of digitally controlled machines, it it also known to determine electrically a difference between the position reached and a required position, and to feed this difference to a control unit for the purpose of making a correction (German Patent Specification No. 1,577,485 as laid open), this type of stop can, however, only be used in conjunction with complicated and expensive digitally controlled machines.

SUMMARY OF THE INVENTION

The object of the present invention is to provide a positioning device which has stops that act in a very precise manner and which is simple to use and is of general application. The device is characterised in that the stop is constituted by the combination of a signal generator, which in the vicinity of a required position or stop position of the part produces a signal value which passes through zero at the stop position, and of a servo system which is controlled by this signal value and effects the positioning. In this arrangement, the stop may operate electrically or pneumatically, or even hydraulically if required. Indeterminate overrunning of the stop position is rendered impossible by the servo action, whereby a part is always moved into its stop position or required position. The accuracy of the position is dependent only upon the precision of the signal generator or upon the sensitivity of the servo system. The servo system can also be used for actually displacing the part by controlling a servo motor either by the signal-generator of the stop, or by a program or cycle control means associated with the signal generator.

Other objects and advantages of this invention will become appparent upon reading the appended claims in conjunction with the following detailed description and the attached drawing.

BRIEF DESCRIPTION OF THE DRAWING

FIG. 1 shows diagrammatically the electrical equipment of a stop means according to the invention, FIG. 2 shows the signals derived from the signal generator and required for control purposes, FIG. 5 shows a positioning device according to the invention actuating a copying system, FIG. 6 is a diagrammatic cross-section through part of the device shown in FIG. 5, and FIG. 7 shows diagrammatically a device for controlling a cycle of movements.

DESCRIPTION OF THE PREFERRED EMBODIMENT

Figure 4:
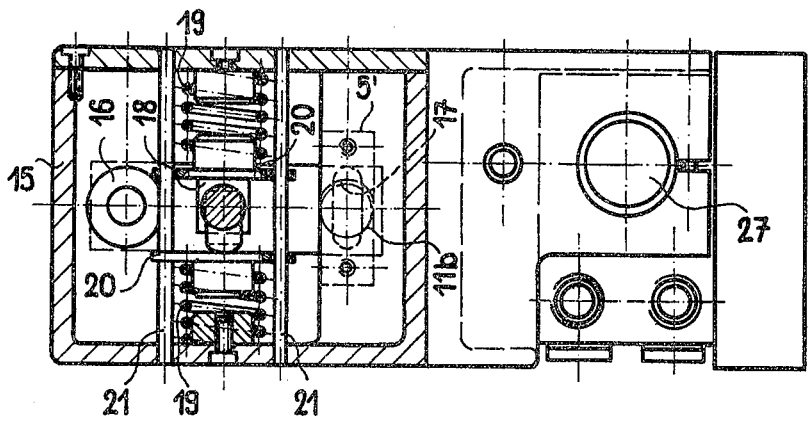
FIGS. 3 and 4 show in longitudinal section and cross-section, respectively, a stop mechanism according to the invention which includes a mechanical stop sensor.

The preferred form of the positioning device as illustrated in FIG. 1 has an adjustable part, e.g. a machine table 1, which can be displaced, by means of a feed screw 2 driven by a spindle of a reversible direct-current servo motor 3, in the direction indicated by the arrow X. A signal generator part 4 indicated diagrammatically, e.g. a small cylinder made of an electrically conductive and/or ferromagnetic material, is provided on the part 1 and, upon displacement of the part 1, moves into the zone of two symmetrical measuring reactance coils 6 of a measuring bridge which are provided on a stationary part 5 of the machine. The measuring bridge is supplied with alternating current by a power source 7. The bridge output acts on a sum-and-difference amplifier 8, the output of which is passed to a demodulator 9. At the output of this demodulator there occurs a signal as shown in graph A of FIG. 2, i.e. as long as the signal generator part 4 is outside the zone of coils 6, the bridge is balanced and no output signal occurs. If the signal generator part 4 moves from one side into the zone of a coil 6 and influences the latter, there then occurs a signal having a particular direction, until the part 4 is disposed symmetrically between the coils 6 in a stop position or required position. Upon further displacement in the same direction, a signal a in the opposite direction occurs, since the effect on the other coil 6 now predominates.

If the signal A is amplified and passed to the servo motor 3, the motor will drive the spindle 2 and will displace the part 1 as long as it receives voltage. The direction of movement is so selected that the part 1 having the signal generator part 4 is on each occasion moved towards the stop position, that is the required position in which the part 4 is symmetrically disposed between the coils 6 and a signal controlling the servo motor 3 no longer occurs. Thus the precise stop position is of necessity always achieved by "hunting". Accuracy in the order of magnitude of $10^{-3}$ mm can be readily achieved.

Figure 3:
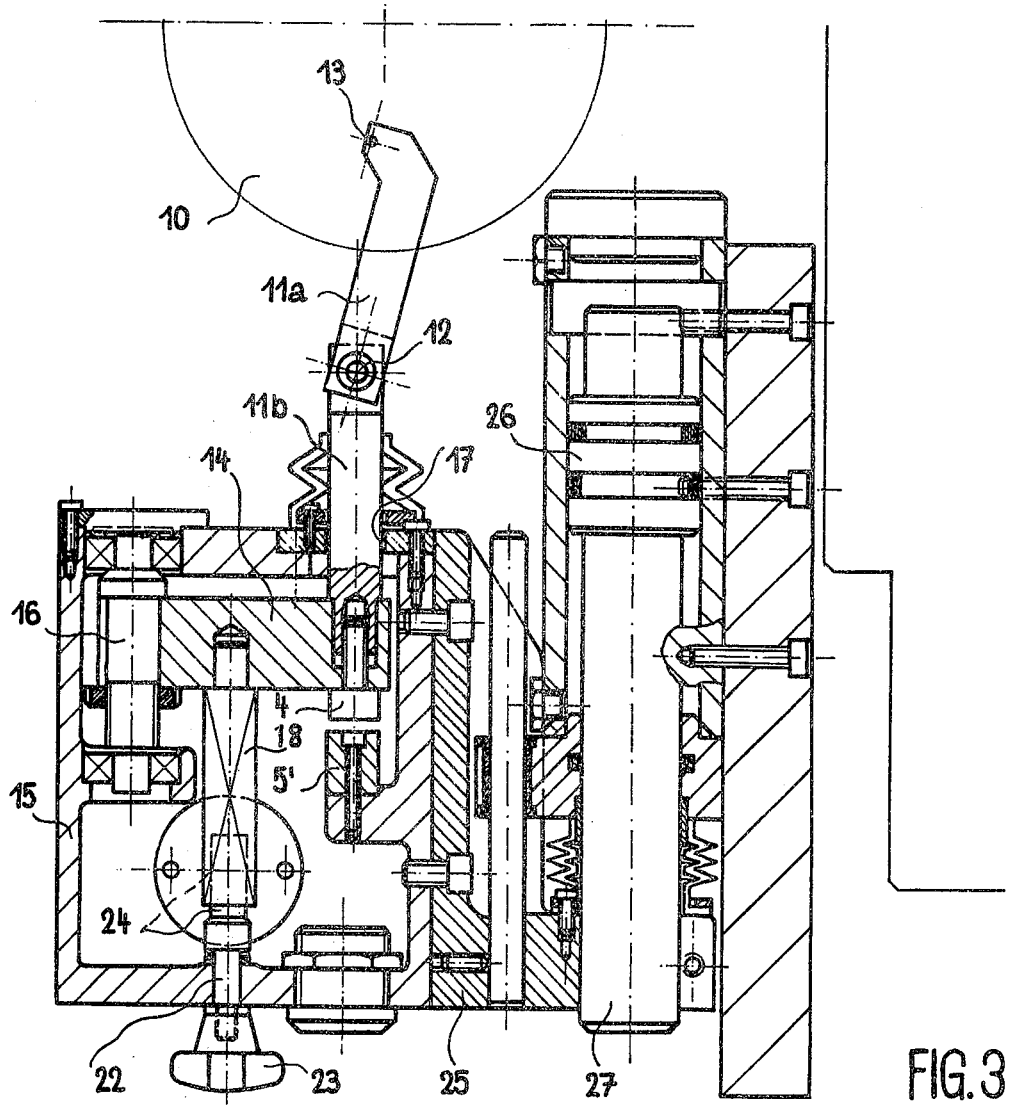

FIGS. 3 and 4 show a form of construction of a stop mechanism incorporating a sensor and in which therefore there is no signal generator part which is directly connected to the part to be adjusted and which acts on the measuring coils. The stop mechanism is used, for example, for obtaining the precise axial position of an end-face or a radial shoulder on a workpiece 10 partly shown in outline in FIG. 3. The sensor has a two-part arm 11a, 11b with a link 12 between these, and stop pins 13 on both sides. The inner part 11b of the arm is secured to a carrier 14 which is mounted in the upper part of a casing 15 and is adapted to swing on a pivot 16. The lateral movement of the inner cylindrical part 11b of the arm is limited by its play in a bore 17 in an end wall of the casing. Secured to the carrier 14 is a signal generator part 4' which acts on the other signal generator part 5', indicated only diagrammatically in the drawing and having laterally opposite measuring coils 6, not shown.

Connected to the carrier 14 is a rod 18 which projects freely into the interior of the casing between two compression springs 19. Inserted between each spring 19 and the rod 18 is a disc 20 which is displaceable along two guide bars 21. Secured to a rotatable shaft 22, having a knob 23 actuable on the outside of the apparatus, is an angle element 24 which extends between one disc 20 and the rod 18 and thus renders the spring on the left of FIG. 4 ineffective, whereas the spring on the right acts on the rod 18 by way of the disc 20 and thus holds the rod, the carrier 14 and the sensor arm 11 in a left-hand end position in which the inner arm part 11b bears against the wall of the bore 17. The system is thus biassed or unbalanced, since the part 4' is disposed symmetrically with respect to the two measuring coils 6 when the sensor arm 11 is disposed symmetrically in the bore 17. The signal generator is thus unbalanced in the illustrated biassed rest position, and produces an output signal A (FIG. 2) having a particular direction.

The casing 15 with the above-described parts is mounted on a slide 25 which can be displaced by a control cylinder, having a piston 26 and by way of the piston rod 27, in order to bring the stop device into the zone of the workpiece 10 and to remove it again after positioning has been completed.

As mentioned above, the stop system is biassed in a particular direction and is unbalanced, the arrangement being such that under the effect of the expected stop pressure of the workpiece against one pin 13, the sensor arm is displaced from the illustrated asymmetrical position into the symmetrical position, i.e. to the right in FIG. 4. During the measurement, the situation is now such that the signal generator in its rest position produces an output signal having a specific direction, under the effect of which the servo system moves the workpiece 10 towards the sensor. As soon as the workpiece encounters the sensor, the latter is moved from the biassed asymmetrical position into its symmetrical position. After any "hunting" that may occur, precise positioning is achieved with the sensor exactly in its median position and the workpiece exactly in its required position. If the sensor were not biassed and the signal generator not unbalanced, a measuring signal would only occur after the stop position has been overrun, and it would then be necessary to make a correction in the rearward direction, and the sensor would not follow any rearward over-correction that might occur. Reliable and rapid hunting to find the zero position or the required position of the workpiece would thus not be ensured.

FIGS. 5 and 6 illustrate diagrammatically the use of the positioning device in a tracing or copying control system. A signal generator 33, having pairs of measuring coils 34x and 34y arranged crosswise, is connected by means of a carrier 32 to a machine table 1 which is displaceable by means of two motors 30x and 30y and two spindles 31x and 31y. The signal generator 33 is disposed above a disc 36 which can be driven by a motor 37 (FIG. 6) at a speed that is adjustable with the aid of a regulating means 38, the signal generator carrying an electrically conductive and/or ferromagnetic cylindrical signal generator part 39. Each two coils 34x and 34y respectively are connected into a bridge, as in FIG. 1, which bridge acts on the servo motor 30x and 30y by way of a servo amplifier 40x and 40y respectively. If firstly the signal generator part 39 is located symmetrically within the coils 34x and 34y as in FIG. 5, then each movement of the part 39 relative to the coils causes detuning of one or both bridges and production of one of both signals A (FIG. 2), respectively and thus causes the associated servo motor to start up in the direction for effecting correction. The table 1 will therefore precisely follow the movement of the part 39, and upon rotation of the disc 39, will execute a circular movement as shown by the broken lines in FIG. 5. This control of the table 1 can be used, for example, for millng an annular groove or for cutting a circular portion from a workpiece. As indicated above, very high precision can be achieved in such operations. This device can be used for copying other movements. The part 39 can be moved, for example, along a template for the purpose of copying any required contour.

FIG. 7 illustrates diagrammatically a further possible construction; In this figure parts equivalent to those illustrated in FIGS. 5 and 6 are designated by the same reference symbols and will not be described in detail. In the arrangement shown in FIG. 7, signal generator parts and stops 39x and 39y made of electrically conductive and/or ferromagnetic material are provided on the machine table and are displaceable along graduated strips 41x and 41y, respectively, in the directions indicated by the arrows. Each of the stops 39 acts on a signal generator part 5x and 5y respectively having two measuring coils as shown in FIG. 1, and each signal generator part is connected to a servo amplifier 40x and 40y, respectively, each of which acts on the associated servo motor 30x and 30y, respectively. The servo amplifiers are connected to a cycle control means 42 which renders the signal generator effective or ineffective. Although the signal generators 5x and 5y are illustrated in FIG. 7 as though they were fitted on a common machine part, it is clear that the signal generator 5x follows the movements of the table 1 in the Y direction so that it always remains in the zone of action of the stops 39x, and that the signal generator 5y follows the table 1 in the X direction, so that it remains in the zone of action of the stops 39y. Because of these follow-up movements of the signal generators so that they always remain in the zone of action of their respective stops, a signal in accordance with the waveform of graph B of FIG. 2, produced with the aid of logic elements, not illustrated, arises as long as the signal generator part, 5x or 5y is within the range of influence by the stops 39x or 39y, respectively, and by means of this signal it can be ensured that the servo control means is rendered effective only during the occurrence of a signal in accordance with graph A of FIG. 2. Furthermore, in this case, the conditions at each of the ends of the graph A signal determined by the zone of influence of the signal generator can be modified, as indicated by graph C of FIG. 2 to provide an extended signal.

Control proceeds in such a way that a point A on the table moves in the direction indicated by the arrows towards B, C and D and then back to A. As this happens, the stops each take over control when they come into effect and cause the table 1 to find the one position by hunting. Then the cycle control system becomes effective again and moves the table into the next stop position in which the corresponding stop again becomes effective and moves the table into the precise position.

As indicated previously, the electrical signal generators can, in practically all cases, be replaced by pneumatic or hydraulic signal generators, which either act directly on a pneumatic or hydraulic servo system, or on one or more servo motors by way of electric circuits.

A considerable advantage of the positioning devices that have been described resides in the fact that it is not absolutely necessary for precision setting of the stops to be carried out mechanically; instead such precision setting can be achieved electrically by appropriate adjustment of the bridge. It will be obvious that when the bridge is electrically detuned, the part 4 (FIG. 1) does not need to be positioned exactly symmetrically between the coils 6 in order to balance the bridge.

What is claimed is:

1. A servo type device of the null-seeking type for positioning a part and wherein a mechanical sensor is provided for engagement with and movement by said positionable part, comprising a reversible motor coupled to said part for effecting reversible movement thereof, a two-component servo signal generator, one component of said generator being a set of reactance coils and the other component being a reactance varying member, one of said signal generator components being stationary and the other component being mounted on said mechanical sensor for movement in one direction or the other from a null signal position in which the coil reactances are balanced so as to increase the reactance of one coil and simultaneously decrease the reactance of the other, means for resiliently biassing said mechanical sensor away from said null signal position in one direction or the other comprising end stops between which said mechanical sensor is mounted for movement, corresponding springs for biassing said mechanical sensor towards each end stop, and means for optionally rendering one or the other spring effective, a bridge circuit in which said coils are connected in different arms thereof, and means connecting the output terminals of said bridge circuit to said motor whereby the bridge output signal resulting from an unbalanced condition of said reactance coils causes said motor to be actuated to move said part and also said mechanical sensor in the direction which will re-establish the null signal position.

2. A servo device as defined in claim 1 wherein said biassing springs are of the compression type and wherein said machanical sensor comprises a rod located between said compression springs, there being a disc located between each said compression spring and said rod, and an eccentric pivoted substantially about the axis of said rod for moving either of said discs against the force of its associated spring.

3. A servo type positioning device for use in a tracing or copying control system comprising a table mounted for displacement in mutually perpendicular directions respectively along x and y axes, a first reversible motor for positioning said table along the x-axis, a second reversible motor for positioning said table along the y-axis, two sets of spaced measuring reactance coils arranged in mutually perpendicular directions and mounted on a support connected to said table such that one set of coils is aligned with the x-axis and the other is aligned with the y-axis, a table movement control member positioned in the space between and movable relative to both sets of reactance coils for varying the reactance thereof, a null-balance type bridge circuit for each set of reactance coils and wherein the coils of each set are located in different arms of the respective bridge such that the reactance value of one coil is increased whilst that of the other coil is simultaneously decreased from null point values as said control member is shifted therebetween, and circuit means connecting the output from each bridge circuit to the corespponding reversible motor.

4. A servo type positioning device as defined in claim 3 wherein said table movement control member is mounted on a support rotatable about an axis so as to describe a circular path.

* * * * *